United States Patent

Baranek et al.

[11] Patent Number: 5,775,816
[45] Date of Patent: Jul. 7, 1998

[54] BEARING ARRANGEMENT

[75] Inventors: Bodo Baranek, Schenefeld; Ralf Mann, Huje; Rainer Landowski, Nutteln, all of Germany

[73] Assignee: Sihi GmbH & Co KG, Itzehoe, Germany

[21] Appl. No.: 849,358

[22] PCT Filed: Dec. 8, 1995

[86] PCT No.: PCT/EP95/04832

§ 371 Date: Jun. 6, 1997

§ 102(e) Date: Jun. 6, 1997

[87] PCT Pub. No.: WO96/18047

PCT Pub. Date: Jun. 13, 1996

[30] Foreign Application Priority Data

Dec. 8, 1994 [DE] Germany ............... 94 19 709.1

[51] Int. Cl.$^6$ ................................................ F16C 17/22
[52] U.S. Cl. ............................................. 384/278; 384/905
[58] Field of Search ........................... 384/493, 535, 384/538, 557, 564, 581, 585, 905

[56] References Cited

U.S. PATENT DOCUMENTS

| | | | |
|---|---|---|---|
| 4,895,462 | 1/1990 | Takata | 384/493 |
| 4,968,158 | 11/1990 | Atkinson et al. | 384/535 |
| 4,997,297 | 3/1991 | Blount | 384/557 X |
| 5,040,398 | 8/1991 | Nakagawa et al. | 72/199 |
| 5,197,808 | 3/1993 | Takata | 384/493 |

FOREIGN PATENT DOCUMENTS

| | | |
|---|---|---|
| 280030 | 8/1988 | European Pat. Off. . |
| 345214 | 12/1989 | European Pat. Off. . |
| 1295025 | 11/1989 | Japan . |
| 2217612 | 8/1990 | Japan . |
| 3004026 | 1/1991 | Japan . |

*Primary Examiner*—Thomas R. Hannon
*Attorney, Agent, or Firm*—Alix, Yale & Ristas, LLP

[57] ABSTRACT

A device is proposed for centering a bearing bushing on a shaft wherein the bushing is made of a material, such as a ceramic, that is sensitive to tensile stress. At lower operating temperatures the bushing exhibits a degree of play relative to the shaft, but is play-free relative thereto at high operational temperatures. Correct centering of the bushing is ensured even in the higher temperature range by the provision of a pair of centering rings which are connected to the shaft without play and act on the bushing to center it. The centering rings are made of a material which, in comparison to the bushing, is not sensitive to tensile stress. It is expedient to provide the two centering rings at the end faces of the bushing. The clamping action of the centering rings on the bushing assures rotational pull of the bushing at low operating temperatures. The thermal expansion of the bushing and its associated clamping members approximately equals that of the corresponding shaft section to provide a butting driving connection between the shaft and the bushing at the higher operating temperature range.

2 Claims, 1 Drawing Sheet

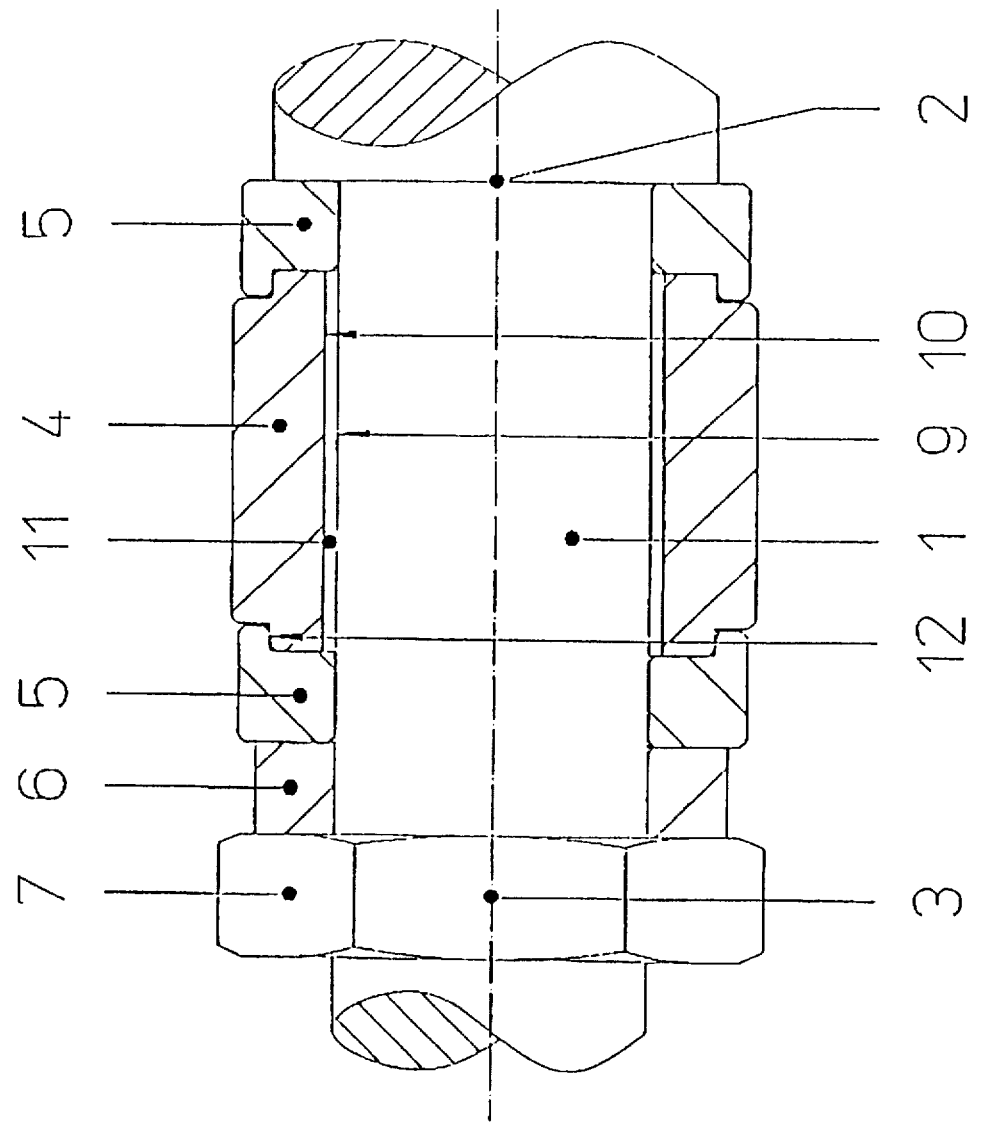

BEARING ARRANGEMENT

CROSS-REFERENCE TO RELATED APPLICATION

This is the national stage of International Application No. PCT/EP95/04832 filed Dec. 8, 1995.

BACKGROUND OF THE INVENTION

For functional reasons, it is often necessary to center a bearing bushing or sleeve on the associated shaft with as little play as possible. This may be problematic, in terms of the thermal expansion of the shaft, if the bushing consists of a material, such as ceramic, which is susceptible to tensile stress and has a smaller coefficient of thermal expansion than the shaft. In order to prevent the shaft from breaking the bushing near the top of the operating-temperature range, it may then be necessary to select the play in the bottom of the operating-temperature range to be greater than may be functionally permissible. A known way of countering this is to use resilient arrangements between the shaft and bushing (EP-B 345 214, DE-C 37 06 365), or resilient centering rings which enclose the bushing on the outside (U.S. Pat. No. 5,197,808), to ensure play-free centering over the entire operating-temperature range. In the latter case, the internal diameter of the bushing and the external diameter of the shaft may be coordinated with one another such that they are equal at the top end of the operating-temperature range and then interact in a play-free and force-transmitting manner. The resilient parts, however, are difficult and complex to produce.

JP-A 129 50 25 discloses an arrangement in which, in order to facilitate the operation of mounting the bushing on the shaft and to prevent the shaft from breaking the bushing, the bushing is seated on the shaft with play. The bushing is carried along in rotation by the shaft via two rings which are seated fixedly on the shaft on both sides of the bushing and are braced axially against the bushing. On the side facing the bushing, the rings have a protrusion which engages axially over a region of the bushing, it being possible for a radial clearance fit or snug fit to be provided between the protrusion and the bushing. However, depending on the dimensioning of the fit between the ring protrusion and the bushing, there may be a relatively large degree of play between the bushing and shaft over the operating-temperature range. Furthermore, the greater thermal expansion of the shaft with respect to the ceramic bushing may mean that the bushing is not braced or held axially between the ceramic rings, with result that it is no longer ensured that the ceramic bushing is carried along in rotation.

SUMMARY OF THE INVENTION

The object of the invention is thus to provide a bearing arrangement with low complexity, over the operating-temperature range, that has the smallest possible degree of centering play between the bushing and shaft and which ensures that the bushing is carried along in rotation.

The invention uses two centering rings, which act on the bushing from the outside, to counter the shaft-surface expansion characteristics, which act on the bushing from the inside. In the cold part of the operating-temperature range, in which there is a relatively large degree of play between the shaft surface and the bore of the bushing, centering is ensured by the play-free abutment of the centering rings, against the outside of the bushing. In the warm part of the operating-temperature range, the shaft surface assumes the centering task while there is play between the centering rings and the bushing. Whereas overdimensioning of the shaft with respect to the bushing bore has to be avoided in each case, it is quite possible, in this context, for the inner circumferential surface of the centering ring, which acts on an outer circumferential surface of the bushing from the outside, to have smaller dimensions than the bushing at the cold end of the operating-temperature range, because this merely results in compressive stresses in the bushing which can usually be safely absorbed by the latter. The centering function of the centering ring may thus be envisaged for a larger temperature range than that of the shaft. In this case, according to the invention, the outer circumference of the shaft and the inner circumference of the bushing are dimensioned such that the bushing and shaft are seated one upon the other in a play-free manner at the top end of the operating-temperature range. The invention accepts that, between the temperature ranges in which the bushing is centered in a play-free manner by the circumferential surface of the shaft and by the centering ring, there remains a temperature range in which there is play both between the bushing and the circumferential surface of the shaft and between the bushing and the inner circumferential surface of the centering ring. However, this play is minimized with respect to the play which would occur between the bushing and the shaft at the cold end of the operating-temperature range if centering rings were not used. This degree of play can easily be kept so low that, in comparison with the degree of bearing play which is permitted, it is negligible. These centering rings may be of straightforward design since they do not have to absorb elastically the expansion difference between the bushing and the centering rings in said operating-temperature range.

Although it is not necessary for the two centering rings, which act on the bushing from opposite end sides thereof, to be identical, it is usually expedient for them to correspond.

In order to prevent the bushing from rotating relative to the shaft, the two rings, which are provided on the end sides of the bushing, are pressed together axially. The axial clamping force is made up of a prestressing force, which is applied, for example, by a shaft nut, and a component which is produced from the different length expansions of the structural parts. For secure clamping, it is necessary for sufficient clamping force also to be ensured at elevated temperature. In order that additional resilient elements can be dispensed with in this case, the invention provides that the length expansion of the structural parts which are subjected to compressive stressing together with the bushing is at least as large as that of the corresponding part of the shaft, subjected to tensile stressing, in the corresponding section. The coefficient of thermal expansion of the shaft material is thus to be selected to be as small as possible, while, in order to compensate for the very low thermal expansion of the ceramic bushing, it may be necessary to select, for the centering rings, a material with very high coefficient of thermal expansion. Alternatively there can be provided between the centering rings or a centering ring and the associated bracing device, an element made of a material with a very high coefficient of thermal expansion. The axial lengths of the bushing and of the centering rings and, if appropriate, also the supplementary structural parts have to be coordinated with one another such that, in their entirety, these parts have the desired expansion behaviour.

If it is not intended for centering rings, which are provided on the end side of the bushing, to project radially beyond the outer surface of said bushing, the end sides of the bushing are expediently provided with a shoulder on which the centering rings can act.

The term "operating-temperature range" is used for the temperature range between the maximum operating temperature and the minimum operating temperature. It is of no consequence whether the temperatures of the shaft, of the bushing and of the centering rings are the same.

BRIEF DESCRIPTION OF THE DRAWINGS

The invention is explained in more detail hereinbelow with reference to the drawing, which depicts an advantageous exemplary embodiment in a longitudinal section.

DETAILED DESCRIPTION OF A PREFERRED EMBODIMENT

Referring now to the drawing in greater detail, the bearing arrangement is shown as including a shaft 1, which consists, for example, of steel, having a shaft collar or shoulder at 2 and a thread at 3, axially spaced from the shoulder. A bushing 4 is mounted on the shaft and is located between a pair of centering rings 5, which are mounted in opposite directions. This arrangement is braced or held axially against the collar 2, via an intermediate ring 6, by the nut 7 located on the thread 3. In the cold state (bottom end of the operating-temperature range), there is a space or play 11 between the outer circumferential surface 9 of the shaft and the inner circumferential surface 10 of the bushing 4. The bushing 4 has cylindrical extensions of a somewhat smaller external diameter 12 at both ends. The centering rings 5 have a bore which interacts with the extensions and, in the expansion state illustrated, at the bottom end of the operating-temperature range, has the same internal diameter 12 or is slightly smaller. The centering rings 5 are centered on the shaft 1. Their material and their centering diameter, which interacts with the outer circumference of the shaft, are selected such that this centering is maintained at least in the bottom-operating temperature range, but preferably also in the middle operating-temperature range.

In the cold state illustrated, the ceramic ring 4 is centered—as is shown—by the centering rings 5, which interact in a play-free manner with the outer circumference 9 of the shaft and with the outer circumference of the ceramic sleeve or ring 4, the interacting circumferential surfaces of the centering rings and of the ceramic ring having the same diameter 12. If the temperature rises, then the shaft 1 and the centering rings 5 expand to the same extent and remain connected in a play-free manner. In contrast, the ceramic ring 4 expands to a lesser extent, this resulting in play developing between the circumferential surfaces with the diameter 12 of the ceramic ring 4 and of the centering rings 5, whereas the play 11 between the ceramic ring 4 and the shaft 1 decreases. In the middle operating-temperature range, there is approximately the same degree of play between the ceramic ring and the shaft, on the one hand, and the centering rings, on the other hand. Since, however, this degree of play is only half the maximum play to be provided on the shaft, this achieves a considerable improvement with respect to the state in which no centering rings are provided. If the centering diameter of the centering rings in the cold state is smaller than the ceramic ring, the play-free state between the ceramic ring and the centering rings is also initially maintained over part of the operating-temperature range as the temperature rises. In each case, the degree of radial play of the ceramic ring is lower than the permissible bearing play.

The ceramic ring is carried along in rotation by the axial clamping caused by the nut 7. The sum of the thermal expansions of the ceramic ring 4, the centering rings 5, the intermediate ring 6 and part of the nut 7 is selected such that it is essentially equal to, or not significantly less than, the thermal expansion of the shaft between the collar 2 and the thread 3. Since the thermal expansion of the ceramic ring is comparatively low, a correspondingly high thermal expansion has to be provided for the rest of the ring parts. This applies, on the one hand, to the centering rings 5. If, in the case of these centering rings, the coefficient of thermal expansion, taking into consideration their centering on the shaft, cannot be selected to be very high, the intermediate ring 6, which may be provided only for this purpose, is selected so as to consist of a material whose coefficient of thermal expansion is higher than that of the shaft.

The arrangement can be used, for example, for fastening bearing bushing in pumps which are operated at high temperatures (for example a few hundred degrees C), the ceramic ring forming the bearing bushing.

We claim:

1. A bearing assembly comprising a shaft having an outer circumferential surface and a bearing bushing subassembly mounted on a predetermined axial length of said outer surface, said subassembly comprising a bearing bushing having an inner circumferential surface spaced from the shaft's outer surface to provide play therebetween and a pair of centering rings centerably retaining the bearing bushing in a play-free manner when the assembly is at the lower end of the assembly's predetermined operating-temperature range, said bushing being composed of a material susceptible to tensile stress and exhibiting a coefficient of thermal expansion smaller than that of the shaft such that the space between the bushing's inner circumferential surface and the shaft becomes virtually zero and said inner surface butts against the shaft's outer surface at the top end of the predetermined operating-temperature range, said centering rings having a higher coefficient of thermal expansion than the bushing and being pressed together axially in order to carry the bushing along during rotation of the centering rings at the bottom end of the operating-temperature range, said centering rings providing play between the bushing and the centering rings in a middle zone of the predetermined operating-temperature range, the thermal expansion of the subassembly along said shaft's predetermined axial length being essentially equal to the thermal expansion of the corresponding length of the shaft at the top end of the operating-temperature range.

2. The bearing assembly of claim 1 wherein the bushing subassembly includes an intermediate ring having a coefficient of thermal expansion higher than that of the shaft.

* * * * *